US010445906B2

(12) United States Patent
Voigt et al.

(10) Patent No.: US 10,445,906 B2
(45) Date of Patent: Oct. 15, 2019

(54) SYSTEM AND METHOD FOR INFERRING OR PROMPTING HVAC ACTIONS BASED ON LARGE DATA STANDARD DEVIATION BASED METRIC

(71) Applicant: Liebert Corporation, Columbus, OH (US)

(72) Inventors: Tyler William Voigt, Delaware, OH (US); Jason Gloeckner, Galena, OH (US)

(73) Assignee: Vertiv Corporation, Columbus, OH (US)

( * ) Notice: Subject to any disclaimer, the term of this patent is extended or adjusted under 35 U.S.C. 154(b) by 0 days.

(21) Appl. No.: 15/035,047

(22) PCT Filed: Dec. 18, 2015

(86) PCT No.: PCT/US2015/066814
§ 371 (c)(1),
(2) Date: May 6, 2016

(87) PCT Pub. No.: WO2017/105505
PCT Pub. Date: Jun. 22, 2017

(65) Prior Publication Data
US 2018/0276860 A1 Sep. 27, 2018

(51) Int. Cl.
*G06T 11/20* (2006.01)
*G01D 7/00* (2006.01)
(Continued)

(52) U.S. Cl.
CPC ............ *G06T 11/206* (2013.01); *F24F 11/30* (2018.01); *G01D 7/005* (2013.01); *G01D 7/08* (2013.01);
(Continued)

(58) Field of Classification Search
CPC . G06T 11/206; G06T 2200/24; G05B 19/042; G05B 2219/2614; G06F 3/04847
(Continued)

(56) References Cited

U.S. PATENT DOCUMENTS 6,622,925 B2   9/2003   Carner et al.
7,315,768 B2   1/2008   Dang et al.
(Continued)

OTHER PUBLICATIONS

International Search Report regarding Application No. PCT/US2015/066814, dated Mar. 3, 2016.
(Continued)

*Primary Examiner* — Ziaul Karim
(74) *Attorney, Agent, or Firm* — Harness, Dickey & Pierce, P.L.C.

(57) ABSTRACT

The present disclosure relates to a computer based system for collecting, analyzing and presenting temperature information from sensors associated with an HVAC system. The system makes use of a processor for communicating with the plurality of sensors and obtaining temperature data reported by each of the sensors. A graphical user interface (GUI) module is provided which is embodied in a non-transient medium and configured to run on a computing device having a display screen. The user GUI module uses the temperature data, in real time, to generate a graph on the display screen. The graph includes a plurality of components each having different indicia to indicate groups of sensors that are below a predetermined lower temperature limit, above a predetermined upper temperature limit, and within a predetermined temperature range. Standard deviation information may be supplied with the graph which relates to the maximum standard deviation of those groups of sensors that are reporting temperatures above and below the predetermined temperature range.

19 Claims, 17 Drawing Sheets

(51) Int. Cl.
  *G01D 7/08* (2006.01)
  *G01K 1/02* (2006.01)
  *G01K 1/04* (2006.01)
  *F24F 11/30* (2018.01)
  *G05B 19/042* (2006.01)
  *F24F 110/10* (2018.01)
  *F24F 11/63* (2018.01)
  *G06F 3/0484* (2013.01)

(52) U.S. Cl.
  CPC ............ *G01K 1/026* (2013.01); *G01K 1/045* (2013.01); *G05B 19/042* (2013.01); *F24F 11/63* (2018.01); *F24F 2110/10* (2018.01); *G05B 2219/2614* (2013.01); *G06F 3/04847* (2013.01); *G06T 2200/24* (2013.01)

(58) Field of Classification Search
  USPC .................................................. 700/276–296
  See application file for complete search history.

(56) References Cited

U.S. PATENT DOCUMENTS

| | | | |
|---|---|---|---|
| 8,331,237 B2 | 12/2012 | Umeda | |
| 8,374,725 B1 | 2/2013 | Ols | |
| 8,854,822 B2 | 10/2014 | Hazzard et al. | |
| 8,917,512 B2 | 12/2014 | Lozon et al. | |
| 8,917,513 B1 | 12/2014 | Hazzard | |
| 9,046,897 B2 | 6/2015 | Klinger | |
| 9,175,868 B2 | 11/2015 | Fadell et al. | |
| 2007/0026107 A1* | 2/2007 | Wang | C12Q 1/04 426/55 |
| 2010/0127880 A1 | 5/2010 | Schechter et al. | |
| 2014/0222241 A1* | 8/2014 | Ols | G05B 15/02 700/299 |
| 2014/0277765 A1* | 9/2014 | Karimi | G05B 15/02 700/276 |
| 2014/0316581 A1* | 10/2014 | Fadell | G05D 23/1904 700/276 |
| 2015/0035680 A1* | 2/2015 | Li | G01K 1/14 340/584 |
| 2015/0102101 A1 | 4/2015 | Hazzard | |
| 2015/0200985 A1 | 7/2015 | Feldman et al. | |
| 2015/0227870 A1* | 8/2015 | Noboa | G06Q 10/0635 705/7.28 |

OTHER PUBLICATIONS

Written Opinion regarding Application No. PCT/US2015/066814, dated Mar. 3, 2016.

* cited by examiner

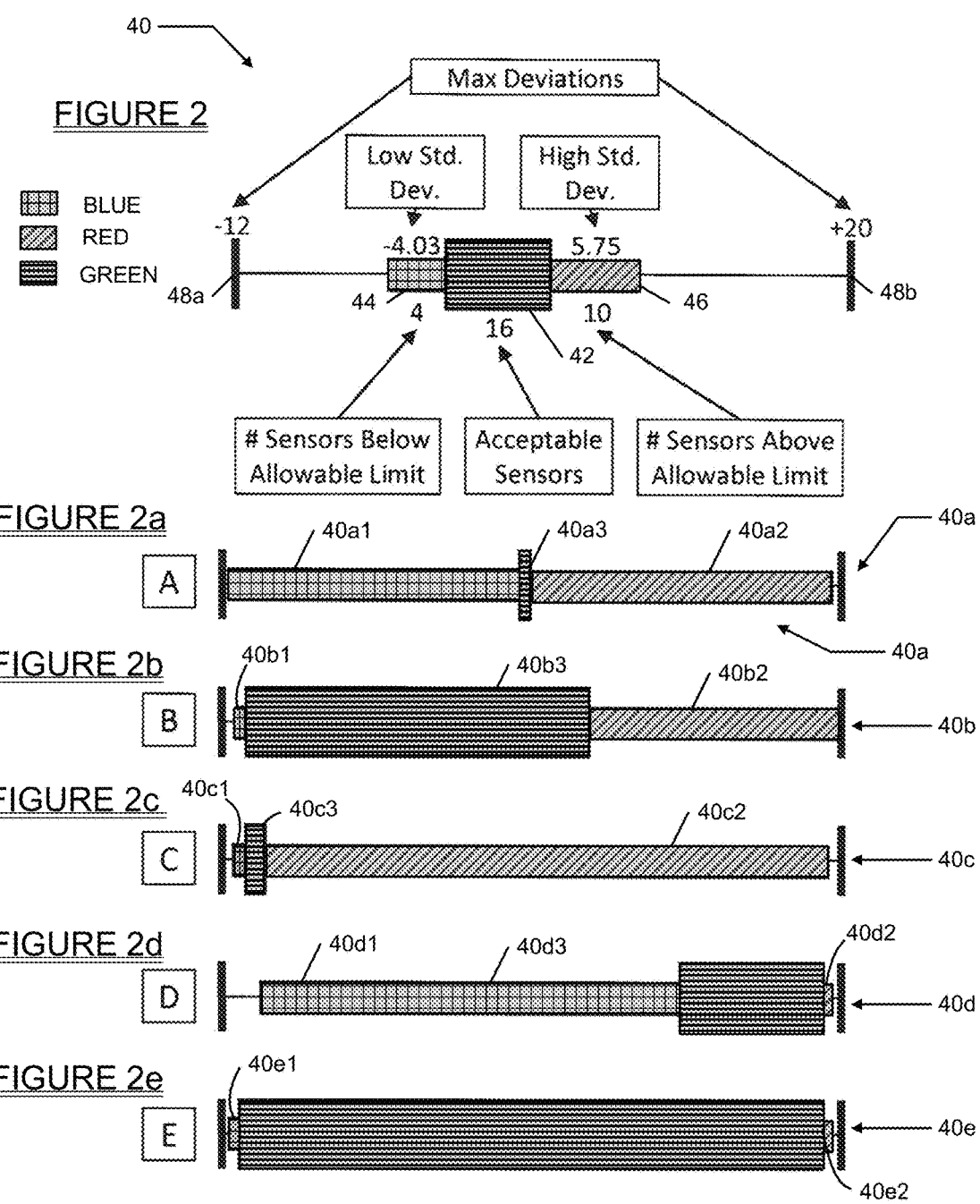

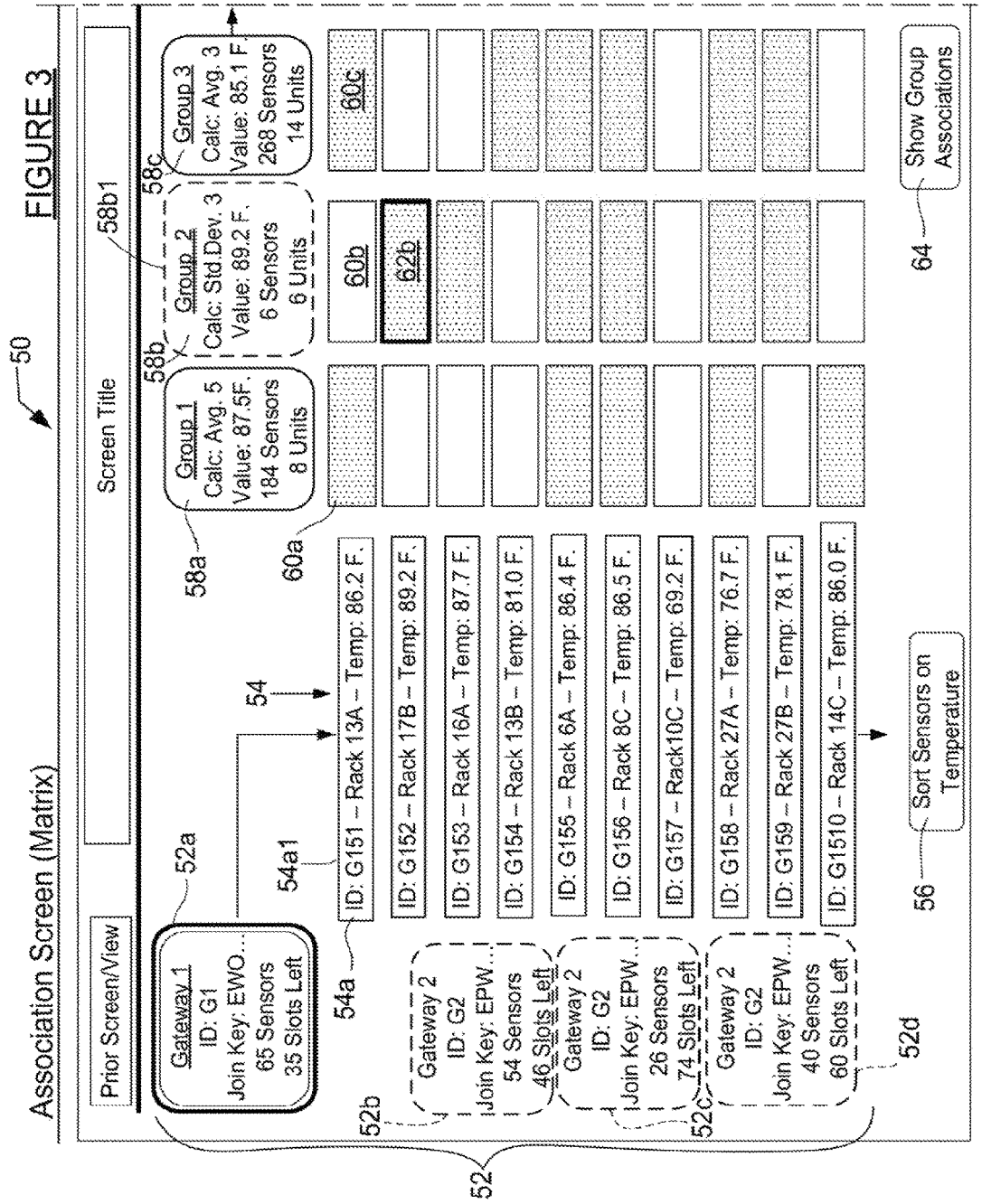

FIGURE 5A

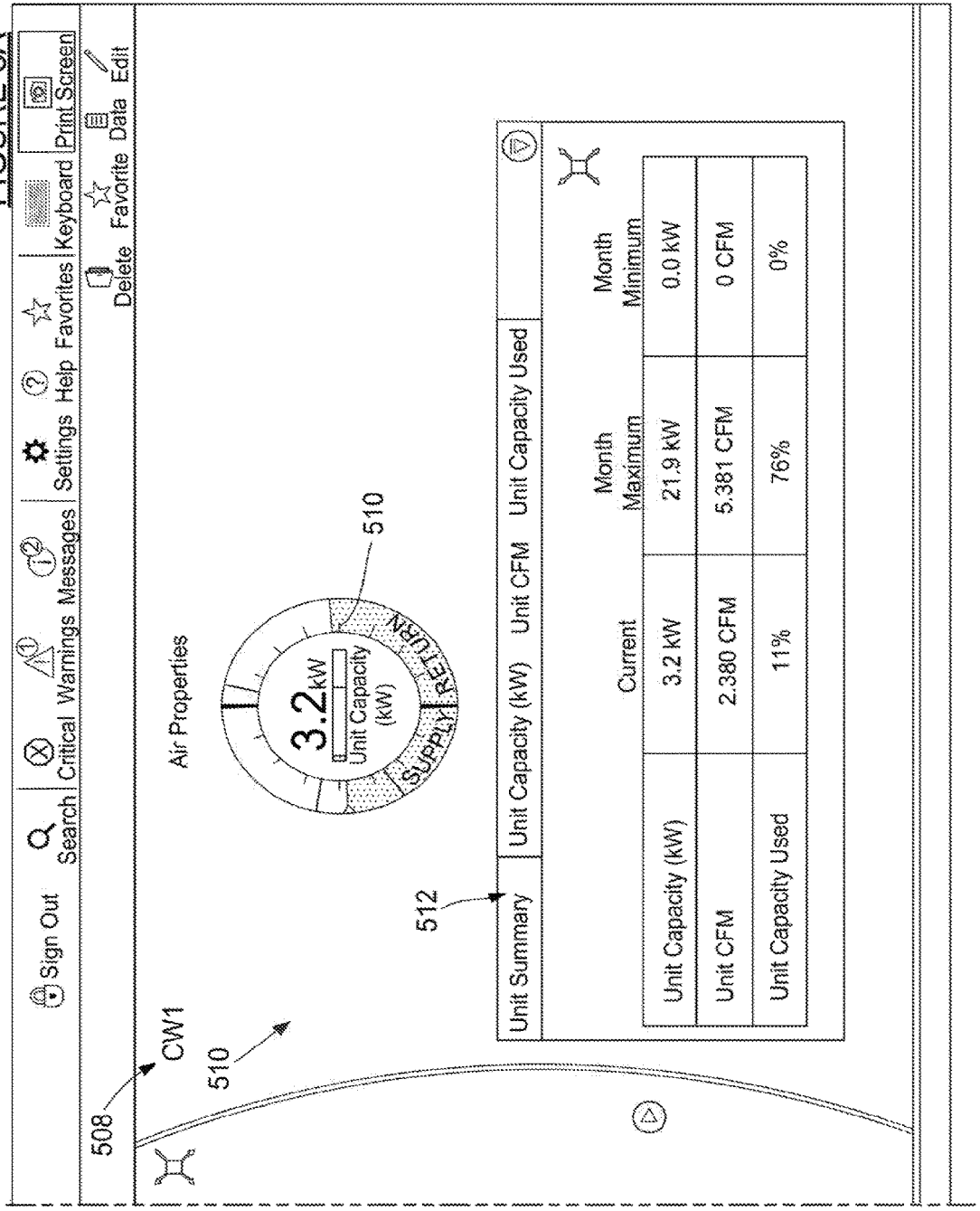

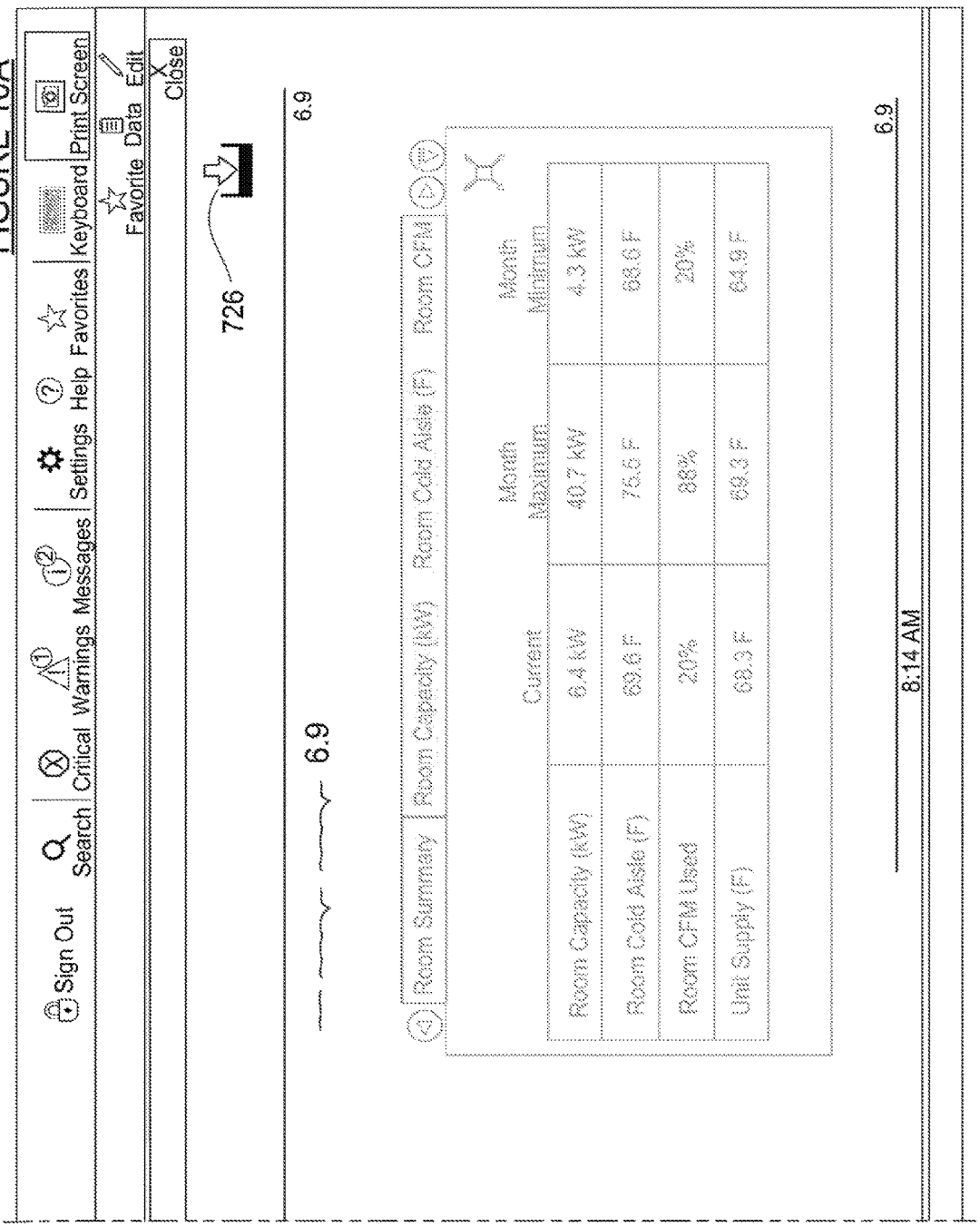

SYSTEM AND METHOD FOR INFERRING OR PROMPTING HVAC ACTIONS BASED ON LARGE DATA STANDARD DEVIATION BASED METRIC

CROSS REFERENCE TO RELATED APPLICATION

This application is a U.S. National Phase Application under 35 U.S.C. 371 of International Application No. PCT/US2015/066814, filed on Dec. 18, 2015. The entire disclosure of the above application is incorporated herein by reference.

FIELD

The present disclosure relates to systems and methods for analyzing data collected from sensors and other components typically used in monitoring cooling in an environment such as a data center, and more particularly to a system and method for analyzing large amounts of data and presenting the data for display in a manner which allows a user to more quickly and easily grasp which areas of an environment, for example a data center, are within preset temperature boundaries, and which areas are above and/or below preset temperature boundaries.

BACKGROUND

The statements in this section merely provide background information related to the present disclosure and may not constitute prior art.

When trying to decipher large data sets of information, especially with regards to sensor temperature data in an HVAC (heating, ventilation, air conditioning) monitoring and control system, breaking the large amount of data reported down to a point where the data allows for meaningful and easily determined actions to be taken by an individual entrusted with managing the HVAC system can be difficult. The fact that alert thresholds can be different among various temperature sensors means that the data needs to be normalized before specific action can be taken. Normalizing the sensor signals from hundreds or even thousands of sensors that may be used in a large HVAC system becomes important, particularly as individual sensor values become irrelevant. Individual sensor values become irrelevant when the primary interest of a user who is responsible for monitoring performance of the HVAC system in a given data center or other form of building are the deviations from what the sensor values should be.

Another challenge is presenting the large amount of data to the user in a manner that allows for decisions on modifying set points, changing unit groupings, changing sensor assignments, etc. to be easily determined and implemented by the user. Providing a manner of displaying large amounts of sensor information showing uniformity or lack of uniformity in temperature distribution within a data center or other building or enclosed structure, would be highly important for enabling the user to quickly gauge where cooling resources are being over-utilized with the data center or building, as well as where additional cooling resources are required, and further where cooling resources are being adequately used.

SUMMARY

In one aspect the present disclosure relates to a computer based system for collecting, analyzing and presenting temperature information from sensors associated with an HVAC system. The system may comprise a processor for communicating with the plurality of sensors and obtaining temperature data reported by each of the sensors. A graphical user interface (GUI) module may be embodied in a non-transient medium and configured to run on a computing device having a display screen. The user GUI module uses the temperature information to generate, in real time, a graph on the display screen. The graph may include a first component having a first indicia indicating a first subportion of the plurality of sensors that are indicating a temperature which is within a predetermined temperature range. The graph may also include a second component having a second indicia indicating a second subportion of the plurality of sensors that are indicating a temperature which is below a predetermined lower temperature limit. The graph may also include a third component having a third indicia indicating a third subportion of the plurality of sensors that are indicating a temperature which is above a predetermined upper temperature limit.

In another aspect the present disclosure relates to a computer based system for collecting, analyzing and presenting temperature information from sensors associated with an HVAC system. The system may comprise a processor for communicating with the plurality of sensors and obtaining temperature data reported by each of the sensors. A graphical user interface (GUI) module may be embodied in a non-transient medium and configured to run on a computing device having a display screen. The GUI module is configured to receive information from the processor concerning temperature data being reported by the sensors and to generate, in real time, a graph on the display screen. The graph may include a first component having a first indicia indicating a first subplurality of the plurality of sensors that are indicating a temperature which is within a predetermined temperature range. The graph may also include a second component having a second indicia indicating a second subplurality of the plurality of sensors that are indicating a temperature which is below a predetermined lower limit, along with a standard deviation number associated with the temperature data representing the second subplurality of sensors. The graph may also include a third component having a third indicia indicating a third subplurality of the plurality of sensors that are indicating a temperature which is above a predetermined upper temperature limit, along with a standard deviation number associated with the temperature data representing the third subplurality of sensors.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a graph that may be generated by the system which provides a high level depiction of a subquantity of a total number of sensors that are reporting a temperature below their specific predetermined lower limit, a subquantity of sensors that are reporting a temperature above their specific upper predetermined limit, and a subquantity of sensors that are reporting a temperature within their specific predetermined temperature range;

FIGS. 2a-2e illustrate other variations of the graph of FIG. 2 to illustrate other operating scenarios with the monitored environment;

FIG. 3-3A is an illustration of an association matrix screen that may be generated by a software subsystem of the present disclosure to enable a user to both assign or "associate" different sensors into one or more sensor groups, while displaying in a grid-like fashion the associations of all the sensors with their respective group(s), and further displaying a wide variety of other information relating to system performance, calculation results, and/or user selections;

FIG. 8-8A shows a pair of cross hairs that may be used with the room layout display of FIG. 7-7A to precisely indicate any given component in the selected room, and wherein a separate display pane is generated that shows detailed information on the selected component if applicable;

FIG. 10-10A shows the screen of information that the system 10 generates from the selection of the wireless radio in FIG. 9-9A, wherein the screen provides information on a battery strength of a battery associated with the selected radio and makes available a wide selection of trend information for the battery strength, and wherein temperature information is also presented for those temperature sensors associated with the radio, and wherein trend information is also made available for each of the temperature sensors.

DETAILED DESCRIPTION

Figure 1:
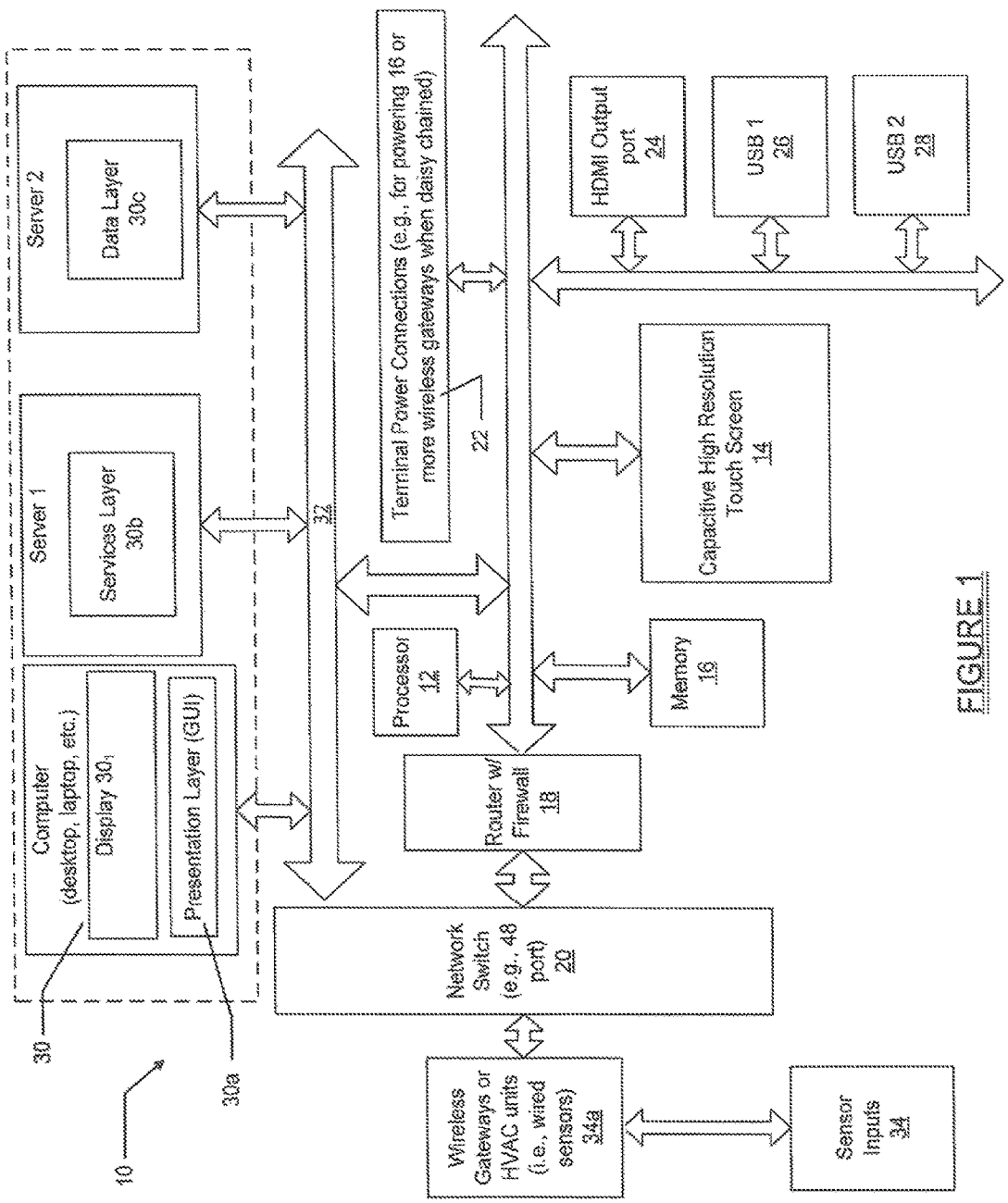
FIG. 1 is a high level block diagram of one embodiment of a system in accordance with the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, a system 10 in accordance with one embodiment of the present disclosure is shown. The system 10 in this example may include a processor 12 (e.g., microcomputer) such as a desktop, laptop, computing tablet, other form of personal electronic device such as a smartphone, or a commercial grade Server. The processor 12 communicates with a high resolution display system 14, such as a touchscreen display, a memory 16 (e.g., RAM, ROM or both), and a router 18 having a firewall. The memory 16 is shown as an independent component, but the memory 16 could be contained in the processor 12 enclosure instead. The router 18 communicates with a network switch 20.

The system 10 also provides terminal power connections 22 for powering a predetermined maximum (at least 16 in this example) quantity of wireless gateways when the wireless gateways are daisy chained together. The system 10 may also include at least one HDMI port 24, a first USB (USB 2.0 or 3.0 protocol) port 26 and preferably a second USB (USB 2.0 or 3.0 protocol) port 28. A remotely located computing device 30 may be in communication with the system 10. The computing device may be a desktop computer, a commercial grade server, a laptop computer, a computing tablet or possibly even a smartphone. Simply for convenience the computing device 30 will be referred to herein as "computer 30".

A software component of the system 10, made up of a plurality of software modules including a graphical user interface (GUI) presentation layer 30a or module, a services layer 30b or module, and a data layer 30c or module may be included for assisting in collecting, analyzing and presenting information in graphical form for display on a display system $30_1$ of the computer 30. It is a principal advantage of the system 10 that the sensor information reported by a large plurality of sensors being monitored by the system 10, and particularly temperature sensors, can be presented on the display system $30_1$ of the computer 30 in a manner in which a large amount of data can be easily understood by a user. In one implementation a presentation layer 30a (i.e., GUI) is loaded onto the computer 30, the service layer 30b is loaded onto a first server (Server 1) and the data layer 30c is loaded onto a second server (Server 2). The computer 30, Server 1 and Server 2 may communicate via a network 32 with one another, as well as with the system 10 to receive the sensor data collected by the processor 12. A dashed line has been used around components 30, 30a, 30b and 30c to indicate that in this embodiment they may be separate and remote from the other components of the system 10. Alternatively, the software modules 30a-30c may all be loaded onto the computer 30. Still further, the software modules 30b and 30c may be loaded onto a single server or multiple distributed servers installed locally or remotely. Still further, the presentation layer 30a, or possibly all the layers 30a, 30b and 30c may be presented on the touchscreen display system 14.

The "Sensor Inputs" box 34 in FIG. 1 is intended to represent all the data received from the various sensors and electronic sensing/measuring devices being used with the various equipment items in a given area such as a data center. In a large data center often hundreds or thousands of temperature sensors, air flow sensors, water sensors, etc. may be used to monitor the equipment and/or ambient environment within the data center, and it is these signals and/or data from these various components which is being input to the system 10, as represented by box 34. Typically the sensor signals 34 are input via a wireless gateway or via one or more HVAC units (i.e., via wired sensors), which are shown in simplified form by box 34a. The use of temperature sensors is of particular importance because of the critical need to maintain the ambient temperature within various rooms or areas of a data center within a predetermined range. Equipment racks that are fully populated with equipment components may be radiating more heat than other racks that are only partially populated with components, and the configuration of the data center itself may impose challenges in maintaining an acceptable ambient temperature throughout all the areas of the data center.

Referring to FIG. 2, the presentation module 30a may be used to provide a graph 40 on the display $30_1$ of the computer 30 which enables the user to immediately gain a general (i.e., "high level") view of the overall temperature conditions within the environment being monitored. In this example the environment is a data center. More particularly, the graph 40 indicates how many temperature sensors within the environment are reporting a temperature within a predetermined acceptable temperature range, represented by a first graph component 42 shown as a box portion, and more particularly in this example a green box portion. For clarity, in this example and explanation it is assumed all sensors being graphically represented have the same allowable operating temperature range. The scope of this explanation should note that, in reality, it is likely that the sensors will have different allowable operating ranges. In this case, the values shown on the graph 40 represent the difference in the sensor value compared to either the low or high allowable sensor value on a per sensor basis and not a common allowable range for all sensors being graphically represented. The graph 40 also shows how many sensors are reporting a temperature below a lower limit of a predetermined temperature range, as represented by a second graph component 44 shown in this example as a blue box. The graph 40 further shows how many sensors are indicating a temperature above an upper limit of a predetermined temperature range associated with each sensor, as indicated by a third graph component 46, which in this example is shown as red box portion. A line 48a is used to indicate the sensor value being reported which represents the largest standard deviation for the group of sensors that are reporting values below the predetermined lower temperature limit (−12 in this example). The line 48b also indicates what the largest standard deviation is for the sensors that are reporting values above the upper predetermined temperature limit (+20 in this example). The number "4" adjacent box 44 indicates the number of sensors reporting a temperature value below the allowable lower temperature limit, and number "−4.03" represents the standard deviation number for the four sensors represented by box 44. Similarly, the number "10" represents the total number of sensors reporting a value which is above the upper predetermined temperature limit, and the number "5.75" represents the standard deviation number for the group of sensors reporting a temperature signal which is above the predetermined upper temperature limit. Accordingly, just a quick glance at the graph 40 provides the user with a "high level" view as to temperature conditions throughout the environment being monitored (e.g., data center in this example).

FIGS. 2a-2e show other variations of how the graph 40 might appear under different conditions. Graph 40a in FIG. 2a indicates via blue shading of box 40a1, the red shading of box 40a2 and the green shading of box 40a3, that most of the sensors are either below their lower limit (box 40a1) or above their upper limit (box 40a2), and that only a small number of sensors are within the upper and lower limits (box 40a3). Graph 40b of FIG. 2b indicates that a small number of sensors are below their lower limit (box 40b1), a majority of the sensors are within their limits (box 40b3) and a relatively large number are above their upper limit (box 40b2). Graph 40c of FIG. 2c indicates a small number of sensors are below their lower limit (box 40c1), a large majority are above their upper limit (box 40c2) and a very small number are within their limits (box 40c3). Graph 40d of FIG. 2d indicates a large number of sensors are below their lower limit (box 40d1), a moderate number are within their limits (box 40d3) and a very small number are above their upper limit (box 40d2). Graph 40e indicates only a very small number of sensors are below their lower limit (box 40e1), the great majority of sensors are within their limits (box 40e3) and only a very small number of sensors are above their upper limit (box 40e2).

Figure 3A:
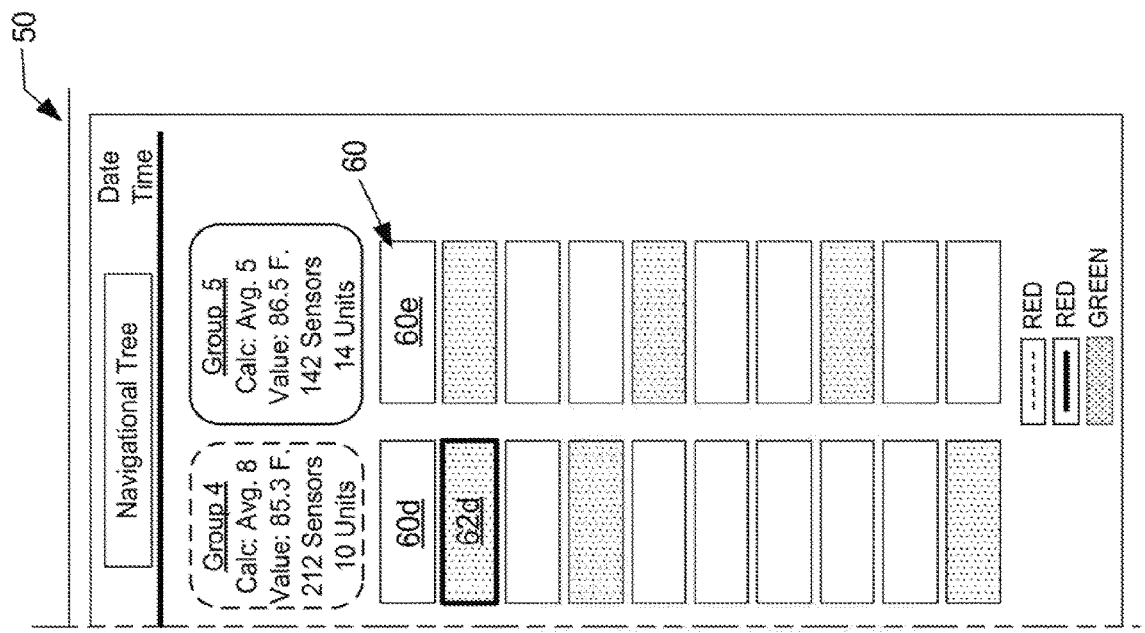

Referring to FIG. 3-3A, an association screen 50 is shown which enables a user to quickly see which sensors are associated with different HVAC groups/teams within an environment (e.g., data center) being monitored and/or controlled. It will be appreciated that the system 10 in this example is employed in a "mesh" network where a plurality of wireless radios transmit and communicate bi-directionally to their respective/pre-programmed parent gateways. In FIG. 3-3A, the association matrix screen 50 presents a tab 52 for each one of the gateways that currently has at least one sensor communicating to it. In FIG. 3-3A tab 52a (Gateway 1) has been selected by the user either using a mouse to make a selection command, or if the display $30_1$ is a touchscreen display, by simply touching on tab 52a. In either event, the tab 52a changes from an opaque presentation to a fully illuminated presentation. The gateways 52b, 52c, and 52d are opaque, indicating that they are available to be examined but are not currently selected. Clicking on any one of gateways 52b, 52c or 52d using a mouse selection command or a touchscreen command would bring up the selected gateway in place of gateway 52a.

The association matrix screen 50 may be displayed on the display $30_1$ (or possibly on the touchscreen 14) and provides information at a glance that enables a user to "associate" any particular sensor with any one or more groups of sensors. The sensors are illustrated in column 54, with sensor 54a being the first listed sensor (ID: G1S1-Rack 13A-Temp 86.2F). This information explains that the identification number for sensor 54a is "G1S1", that it is located on equipment rack "13A", and that it is currently reporting a temperature of "86.2F". A colored line 54a1 may be used to provide an immediate visual illustration of a status of sensor 54a relative to a predetermined temperature range that the sensor is expected to operate in. Thus, the line 54a1 may be colored dark blue, for example, if sensor 54a is reporting a temperature indicating that it is below a predetermined lower temperature limit (e.g., 65 degrees F.), or it may be colored red if it is above a predetermined upper temperature limit (e.g., 85 degrees F.), or it may be colored any one of one or more intermediate colors to signify how close it is to its upper or lower limit. A neutral color such as gray may be used to indicate that the sensor is reporting a temperature approximately in the middle of its predetermined temperature range. A control selection 56, when selected by the user using a mouse or touchscreen command, sorts the sensors by temperature placing the sensors in descending order from hottest to coldest. Of course, this selection could be modified to instead list the sensors in order from coldest to hottest.

The association screen 50 further displays an information tab 58a, 58b, 58c, etc., for each group of sensors that have been previously defined. For example, "Group 1", identified by reference number 58a, provides information explaining that a calculation of the average of the 5 warmest temperature sensors is selected for purposes of control and that this value of the temperatures being reported from the sensors of Group 1 is 87.5 degrees F., that Group 1 includes a total of 184 sensors being associated to a group in which 8 HVAC units belong. A colored line, such as line $58b_1$, may define each information tab to represent whether the group of sensors is within a predetermined temperature range, or below the predetermined temperature range (e.g., blue line), or above the upper limit of the predetermined temperature range (e.g., red dashed line $58b_1$). Tab $58b$ provides information that the temperature values of the group represent a third calculation method based around standard deviation is selected. It should be noted the calculations described herein are for example purposes only and may vary in different implementations and executions of the invention. As such, the calculations described herein should not be interpreted as limiting the scope of the system 10 described herein.

The association screen 50 also provides a plurality of fields 60a-60e arranged in an X-Y grid of rows and columns to indicate which group (or groups) each sensor is presently associated with. By "associated with" it is meant which group or groups each sensor is designated as being grouped with. Thus, each sensor can be grouped with one, two, or more distinct groups of sensors. This is valuable for those sensors that may be located at a borderline or overlapping zones of influence in an environment, and thus where it would be helpful to include the sensor's readings in making calculations for two or more different groups of sensors. In this example sensor 54a (G1S1) is associated with groups 58a and 58c. The user is able to move a horizontal scrolling control (not shown) on the display screen $30_1$ to scroll horizontally and see all additional groups that sensor 54a is associated with. Any field associated with a group in which the sensors of the group are above an upper predetermined temperature limit may also be bordered with a colored or shaded line, such as indicated with fields 62b and 62d. This also provides an immediate visual indication to the user that that specific group has a mean temperature that is above or below the upper predetermined temperature limit. In this example sensor/group combinations 62b and 62d have temperatures that are both above their predetermined upper temperature limits for either the sensor or the group it belongs to.

The system 10 provides the user with the ability to simply click on any particular field 60, 62, if it is not already colored, which instantly associates that particular sensor aligned with the row that that selected field is located in. So for example, making a selection command by clicking on field 60b using a mouse or touchscreen display 14 would immediately associate sensor 54a with sensor group 58b1 (Group 2). Clicking on or touching a field that is already highlighted would dis-associate the sensor from that particular group. This makes it extremely easy and convenient for the user to change sensor group assignments, while still providing the user with a broad picture visual as to which group (or groups) of sensors that each one of the sensors is associated with.

Figure 4:
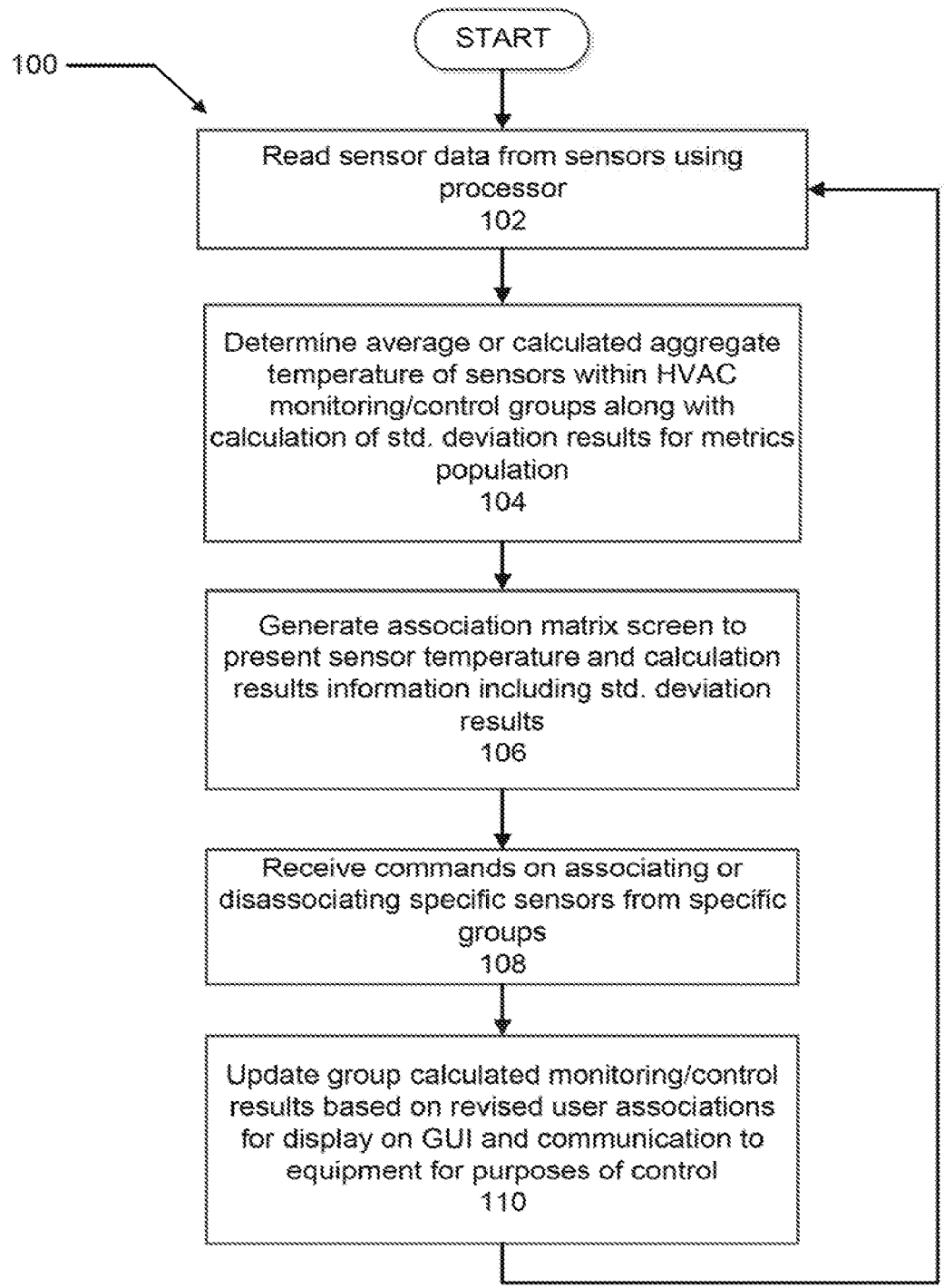
FIG. 4 is a flowchart illustrating basic operations performed by the system in obtaining the sensor data, using the data to generate the association matrix screen and making any updates to the association matrix screen based on commands received from the user.

Referring to FIG. 4 a flowchart 100 is shown setting forth basic operations that the system 10 may perform in generating and updating the association matrix screen 50. The system 10 initially reads and collects sensor data from all of the sensors being monitored and controlled using the processor 12, as indicated at operation 102. At operation 104 an average or calculated aggregate temperature of the sensors within each separate group of sensors is determined, along with standard deviation information associated with the sensors for each group. At operation 106 the software subsystem 30 of the system 10 generates the association matrix screen 50 to present the sensor temperature and standard deviation information on the display screen 14. At operation 108 the software subsystem 30 receives commands from the user via a mouse or touchscreen selection command associating or disassociating specific sensors from specific groups. At operation 110 the software module 30 updates the groups and/or creates new groups pursuant to the commands received from the user, and displays on display screen $30_1$ updated information on the sensors associated with each group along with any updated temperature or standard deviation information which resulted from changes in the sensor composition of any one or more of the groups. The operations 102-110 may then be repeated.

Figure 5:
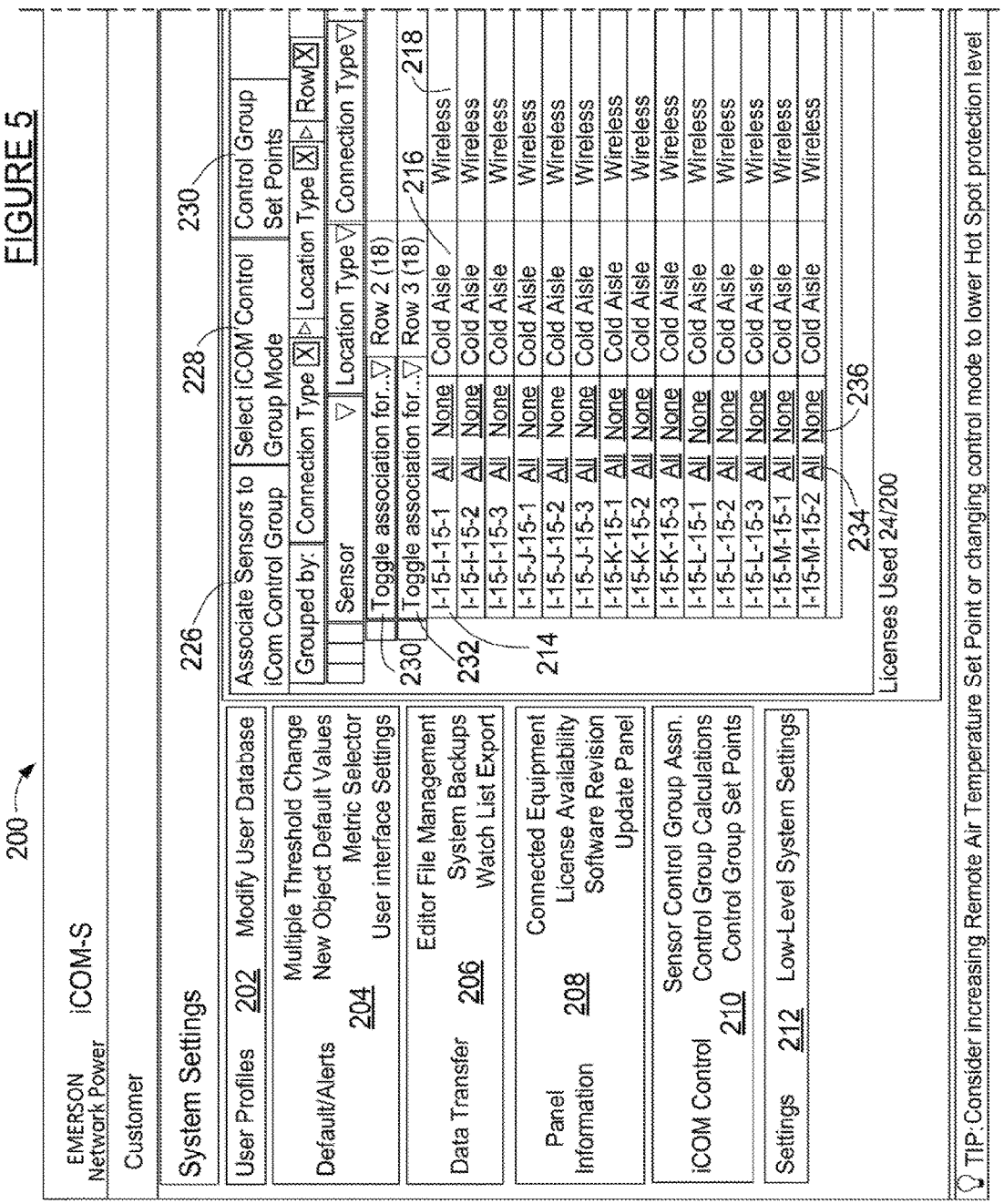
FIG. 5 shows another embodiment of a screen generated by the system for associating each sensor being used with one or more sensor groups, and presenting a grid of information that graphically illustrates the association(s) of every sensor with regards to user sorted sensor classification.
Figure 5A:
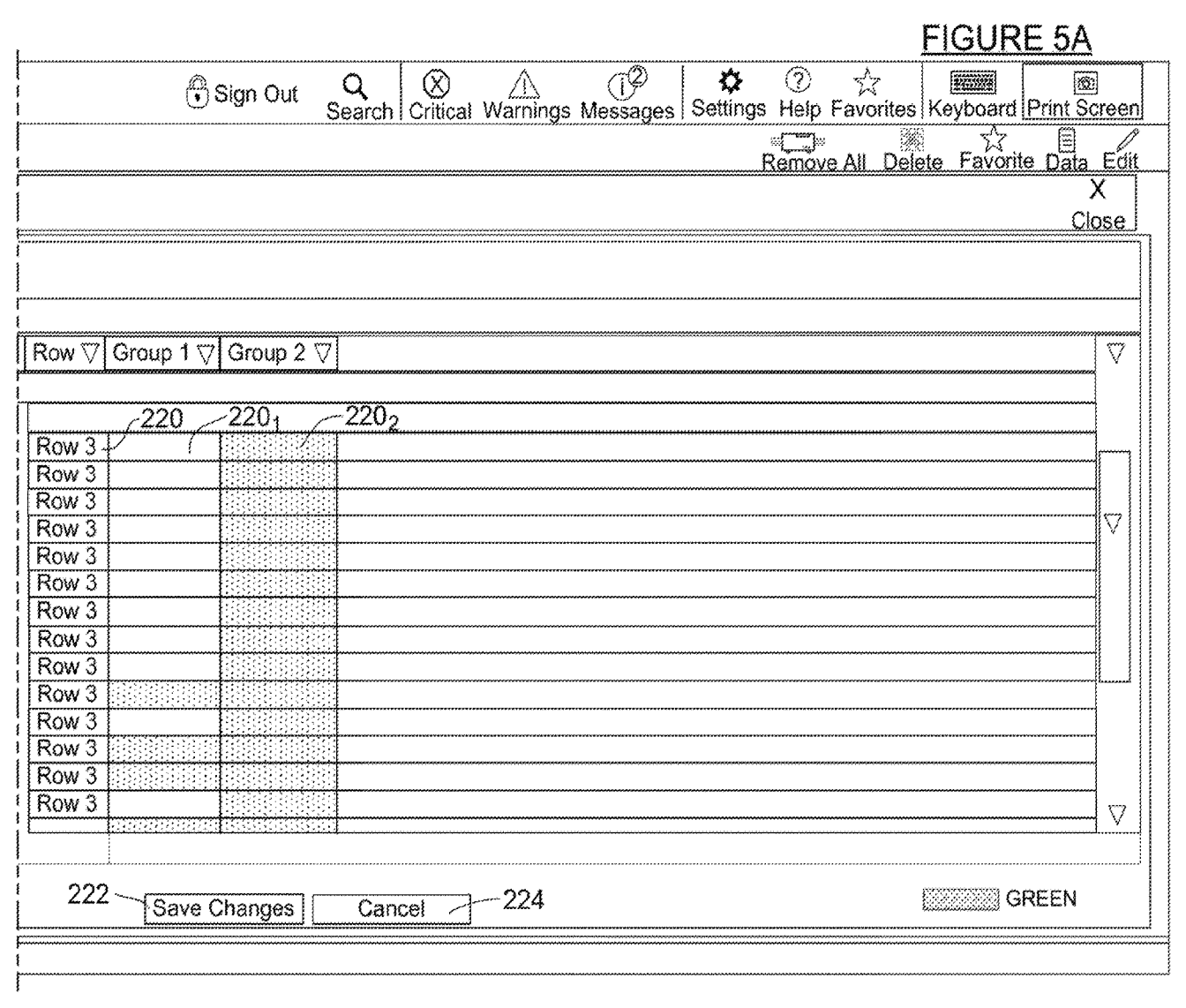

Referring to FIG. 5-5A, screen 200 shows another manner in which the software subsystem 30 of the system 10 may display important information and control options to the user on display screen $30_1$. Screen 200 would thus be used in place of screen 50. Screen 200 presents control selections for "User Profiles" 202, "Defaults/Alerts" 204, "Data Transfer" 206, "Panel Information" 208, "iCOM Control" 210 and "Settings" 212. In FIG. 5-5A, the "iCOM control" selection 210 has been selected which presents a column 214 for listing the identification code (name) for each sensor, a column 216 to show a "Location Type" for each sensor, a column 218 to indicate a connection type of each sensor, a column 220 to indicate which row of equipment racks the sensor is associated with, and columns $220_1$ and $220_2$ to indicate which group(s) each sensor is associated with. Clicking with a mouse (or using a touchscreen command) on any field within column $220_1$ will implement a selection to associate the sensor in that row with the Group 1 sensors. A specific sensor may be associated with any number of different sensor Groups $220_1$-$220_n$. Selecting the "Save Changes" control 222 saves the currently selected sensor group associations. The "Cancel" selection 224 allows the user to cancel any changes that were just made. A principal advantage of screen 200 is that the user is able to see quickly at a glance all, or a substantial portion, of the various groups that a particular sensor is associated with, and can quickly change the association of any given sensor simply by mouse clicking (or touching) on the appropriate field. The information shown in FIG. 5-5A is presented to the user when tab "Associate Sensors to iCOM Control Groups" 226 is selected from screen 200. Tab "Select iCOM Control Group Mode" 228 enables the user to see the sensors and HVAC units that have been assigned to each other on a Group by Group basis while allowing a control calculation to be selected for that specific group. A user can also disable control on individual groups of HVAC units here. Tab "Control Group Set Points" enables temperature set points (e.g., Supply Air and Remote Air) to be set for individual HVAC units or entire group of HVAC units. Toggle option 230 and 232 ("None") can also be used to select or deselect multiple sensors at once based on a customer defined grouping scheme. Selection 234 ("All") and selection 236 ("None") allow specific sensors to be associated with all of the user defined sensor groups or removed from all of the sensor groups.

Figure 6:
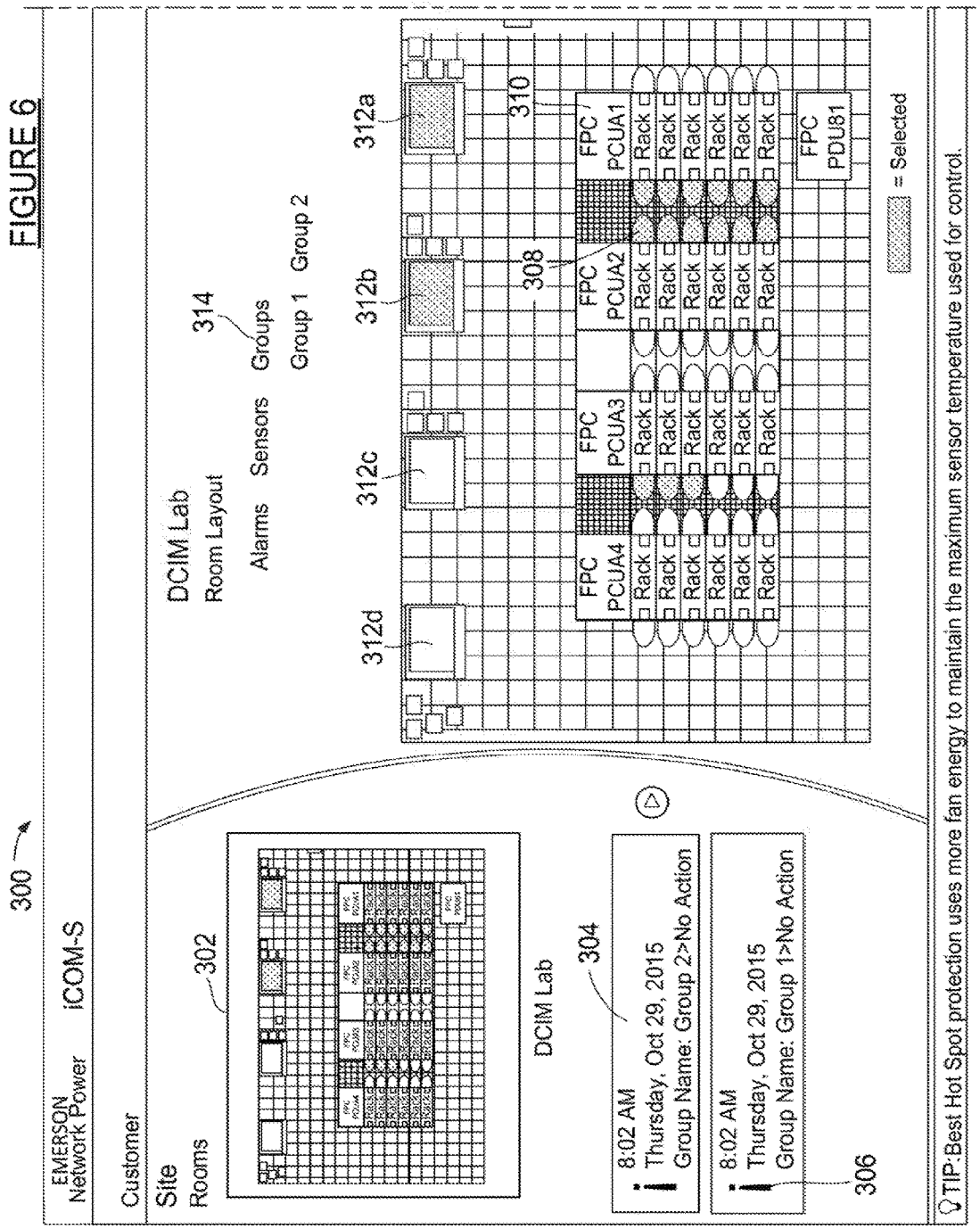
FIG. 6-6A shows a screen generated by the system which depicts the layout of all components being managed by the system within a specific, selected room of a data center, as well as graphically indicating those sensors which are associated with a specific selected sensor group, and further indicating detailed information concerning the selected sensor group in a separate pane of the screen.
Figure 6A:
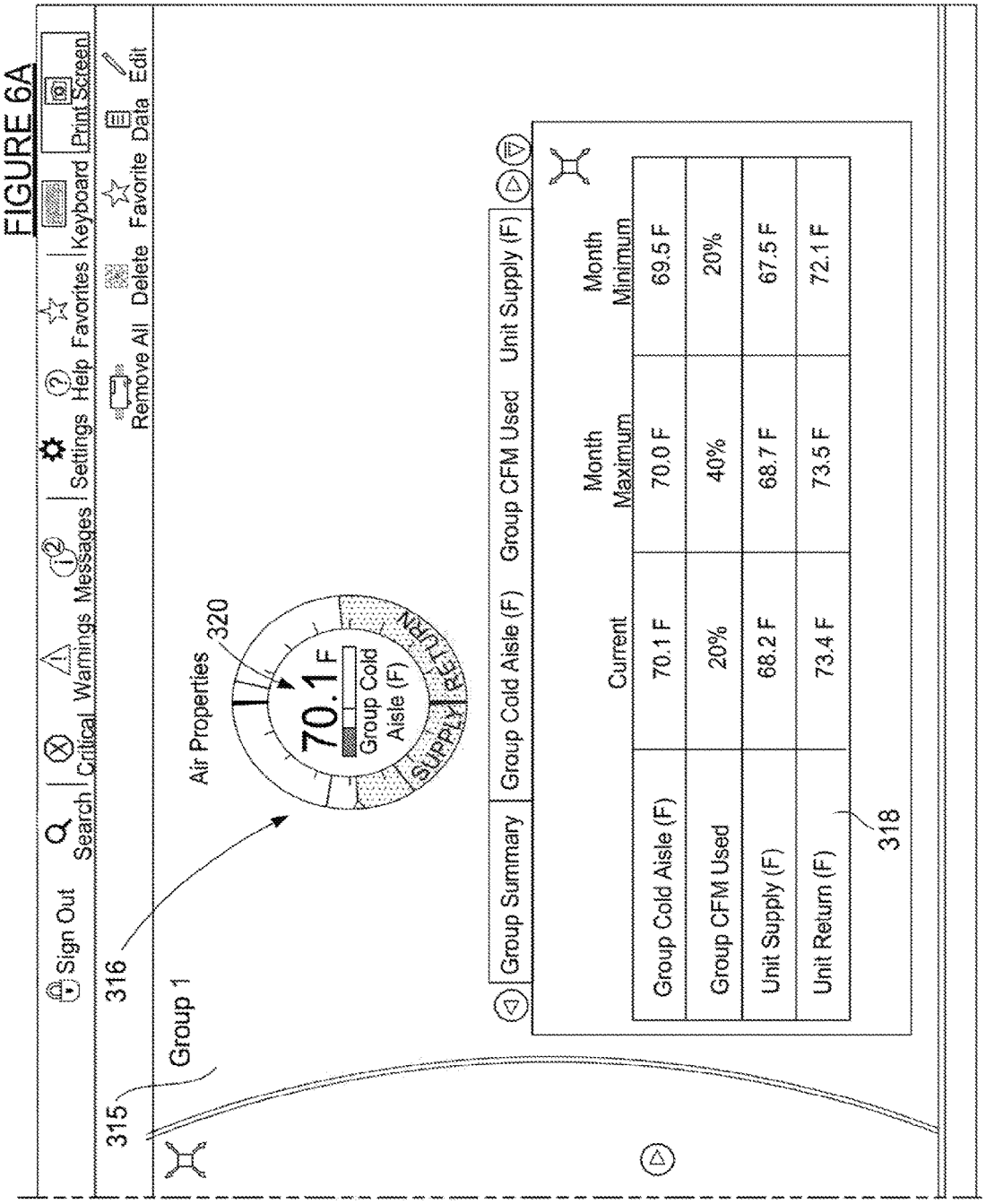

Referring to FIG. 6-6A a screen 300 that the system 10 produces is shown which allows the user to quickly see at a glance which temperature sensors of a selected group of sensors are associated with the various HVAC units in the environment. This enables the user to quickly and visually validate sensor association decisions made on controlling HVAC units in the space. Screen 300 is presented when the user initially selects a thumbnail 302 displayed along the left edge of the screen 300. In this example only one (Room) thumbnail 302 is shown, but in practice a data center (Site) may have a plurality of rooms, and each room will have an associated thumbnail shown along the left edge of the screen 300. Notifications 304 and 306 are Site Wide events and alerts to the user are preferably colored by severity.

The screen 300 of FIG. 6-6A shows highlighted or colored (e.g., with the color blue) indicators 308 which represent the temperature sensors which are associated with a specific group. The indicators 308 are disposed adjacent specific ones of the equipment racks, which are each designated with the name "Rack". The racks are also illustrated along with their respective PDUs 310. Cooling units 312 present in the room are also displayed, and those cooling units that influence the selected group of sensors may be highlighted, such as with the color blue, as indicated by cooling units 312a and 312b. In FIG. 6-6A cooling units 312c and 312d are not associated with the Group 1 sensors, so they are not highlighted. All the different sensor groups are listed under a "Groups" tab 314 when the Groups tab 314 is selected. Clicking (or touching) on the specific group brings up the layout illustration for that selected sensor Group. In FIG. 6-6A the "Group 1" sensor group has been selected for display.

FIG. 6-6A also shows a "Air Properties" graphic 316 along with a table 318 of cooling information related to the Group 1 sensors and cooling units. This information is presented in a separate pane 315 of the screen 300. The "Air Properties" graphic 316 indicates the current temperature 320. The left or "SUPPLY" designation of the Air Properties graphic 316 conveys the weighted average supply air temperature from the HVAC units in the currently selected Group (Group 1), while the right or "RETURN" side of the graphic represents the weighted average return air temperature from the HVAC units in the currently selected Group (Group 1). The triangles on both the left and right side of the dial represent the Supply and Return Air Set Points respectively of the units in that Group. If control is enabled on that Group the "Return" text changes to "Remote" and the blue arc represents the calculated control value being communicated to all of the units in that group. The blue triangle then represents the desired set point the user is trying to maintain typically representative of the cold aisle rack inlet temperature. If either the left or right side arcs extend outside of the recommended range the arc color changes, for example to red, to signify an undesired operating condition is occurring. Table 318 gives a summary of current, maximum for the current month, and minimum for the current month, for each of the Group Cold Aisle temperature, the Group CFM used (CFM used by the cooling units associated with the selected Group), the Unit Supply temperature and the Unit Return temperature. It should be stated these metrics are user selected and the implementation of the system 10 is not limited to only the metrics discussed in this example.

It will also be appreciated that the graph 40 shown in FIG. 2 could be presented as a circular graphic such as the Air Properties graphic 316. But instead of indicating temperatures of supply and return air flow, the circular graphic could be used much like a pie-chart or graph to indicate relative numbers of the sensors that are reporting temperatures above a predetermined upper temperature limit, below a predetermined lower temperature limit, or within a predetermined temperature range. Conversely, the circular Air Properties graphic 216 could be presented in some other graphical form such as a bar graph.

Figure 7:
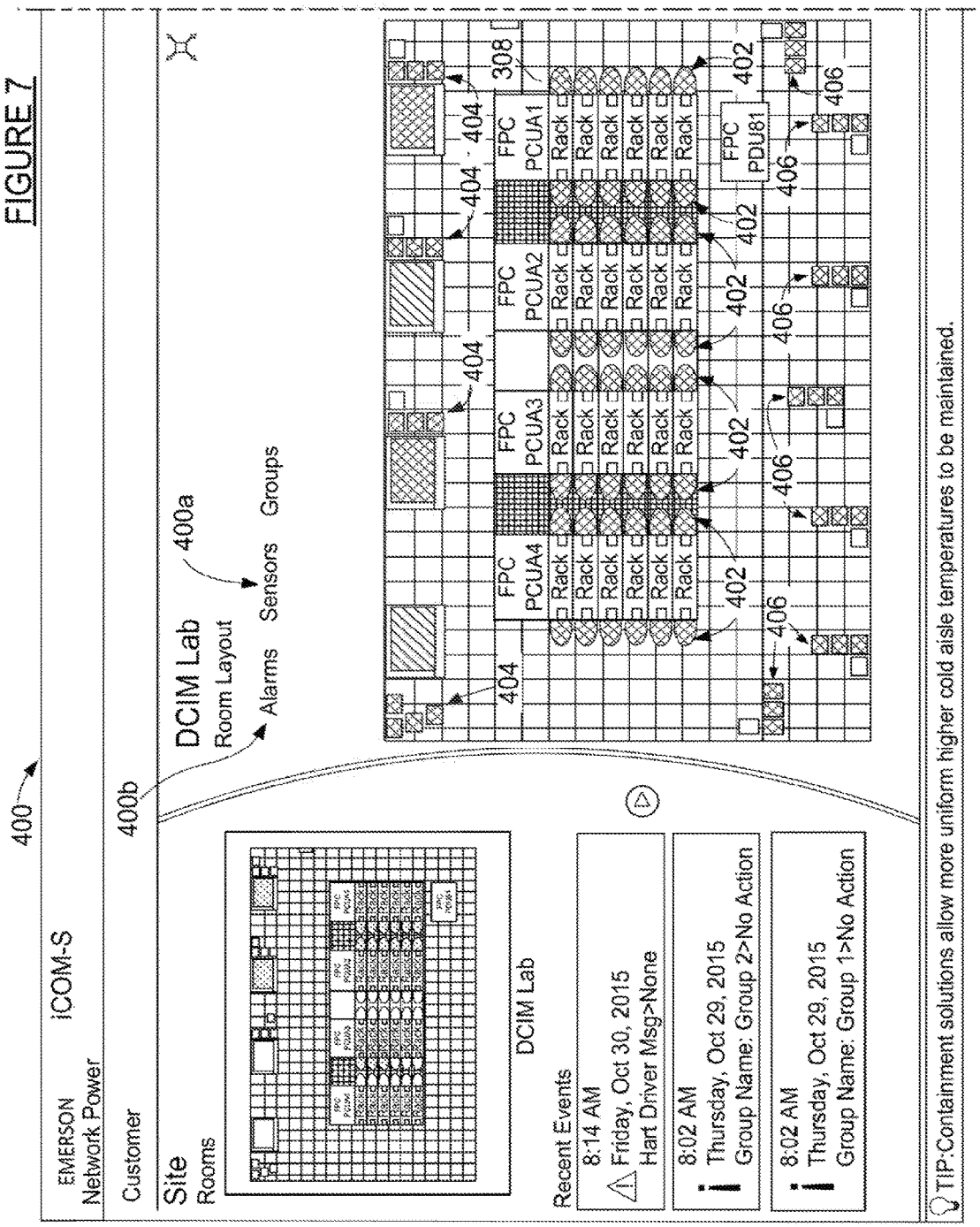
FIG. 7-7A shows a screen generated by the system 10 for depicting the layout of all components being monitored by the system 10 within a selected room, along with information on the amount of cooling capacity (kW) being provided by the system connected HVAC units in the selected room.
Figure 7A:
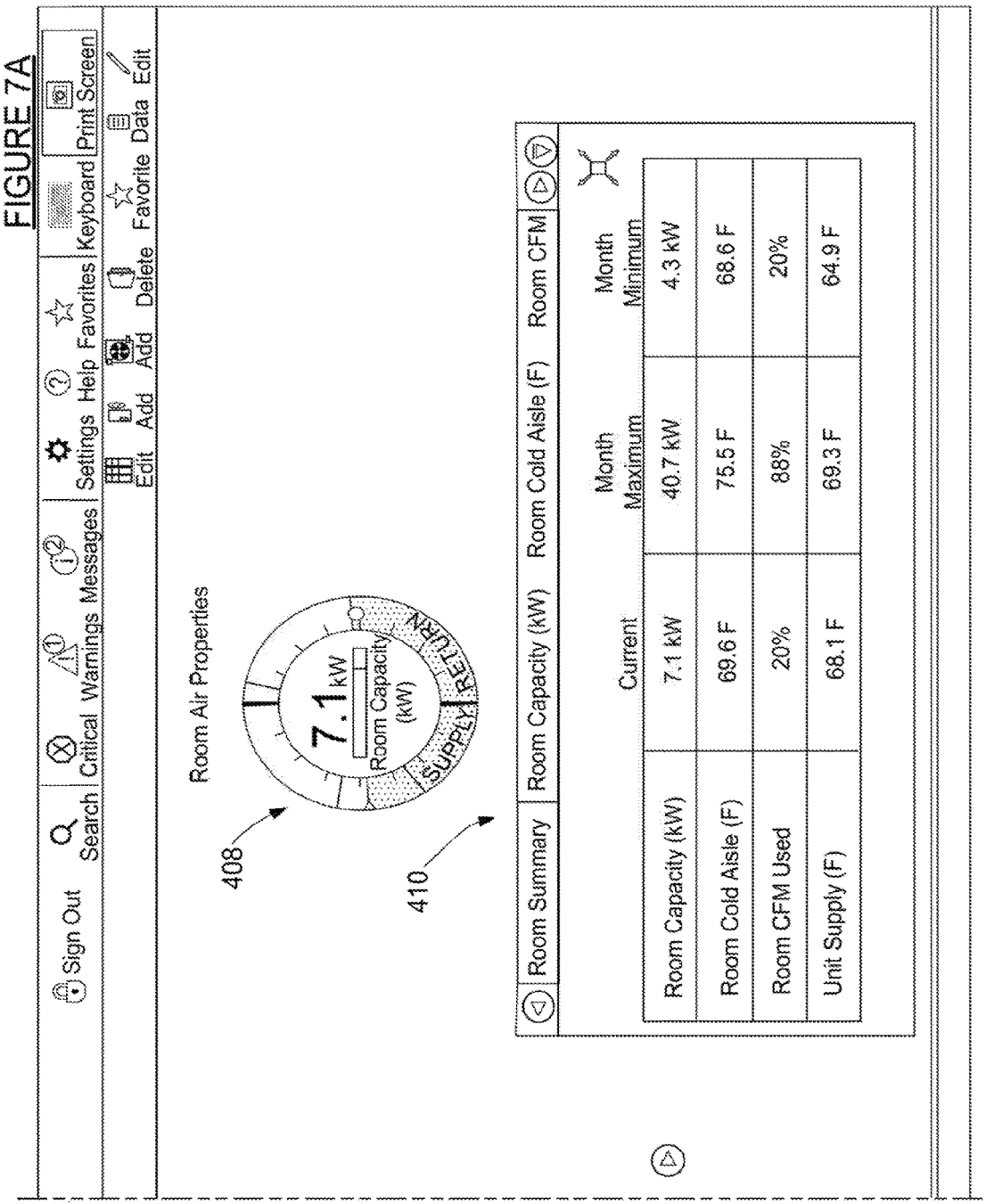

Screen 400 of the system 10 is shown in FIG. 7-7A. Screen 400 is similar to screen 300 but illustrates all of the sensors present and in use in the selected Room. Screen 400 is displayed when the "Sensors" tab 400a is selected by the user. In this example the sensors present in the room include sensors 402 associated with the equipment cooling units, sensors 404 associated with the cooling units and sensors 406 located remotely in the room. The sensor color is dictated by their current value being read to allow the user to quickly see where the warm and cold spots exist in the environment. The "Room Air Properties" graphic 408 in this example provides information on the current cooling capacity being supplied by all of the HVAC units in the currently selected room. A "Room Summary" table 410 provides important information at a glance showing the current, maximum for the month and minimum for the month for each of Room Capacity (in kW), "Room Cold Aisle (F)", "Room CFM Used" and "Unit Supply (F)". Selecting the "Alarms" tab 400b from screen 400 would display (such as by highlighting or a specific color) those sensors or pieces of equipment which have triggered an alarm or alert. Again, it should be noted the metrics discussed above are user selected and provided merely as examples of different types of metrics that the user may select. As such, it will be appreciated that the system 10 is not limited to use with only these metrics, and in actual practice it is anticipated that users will likely customize the system 10 through the use of different types of metrics.

Figure 8:
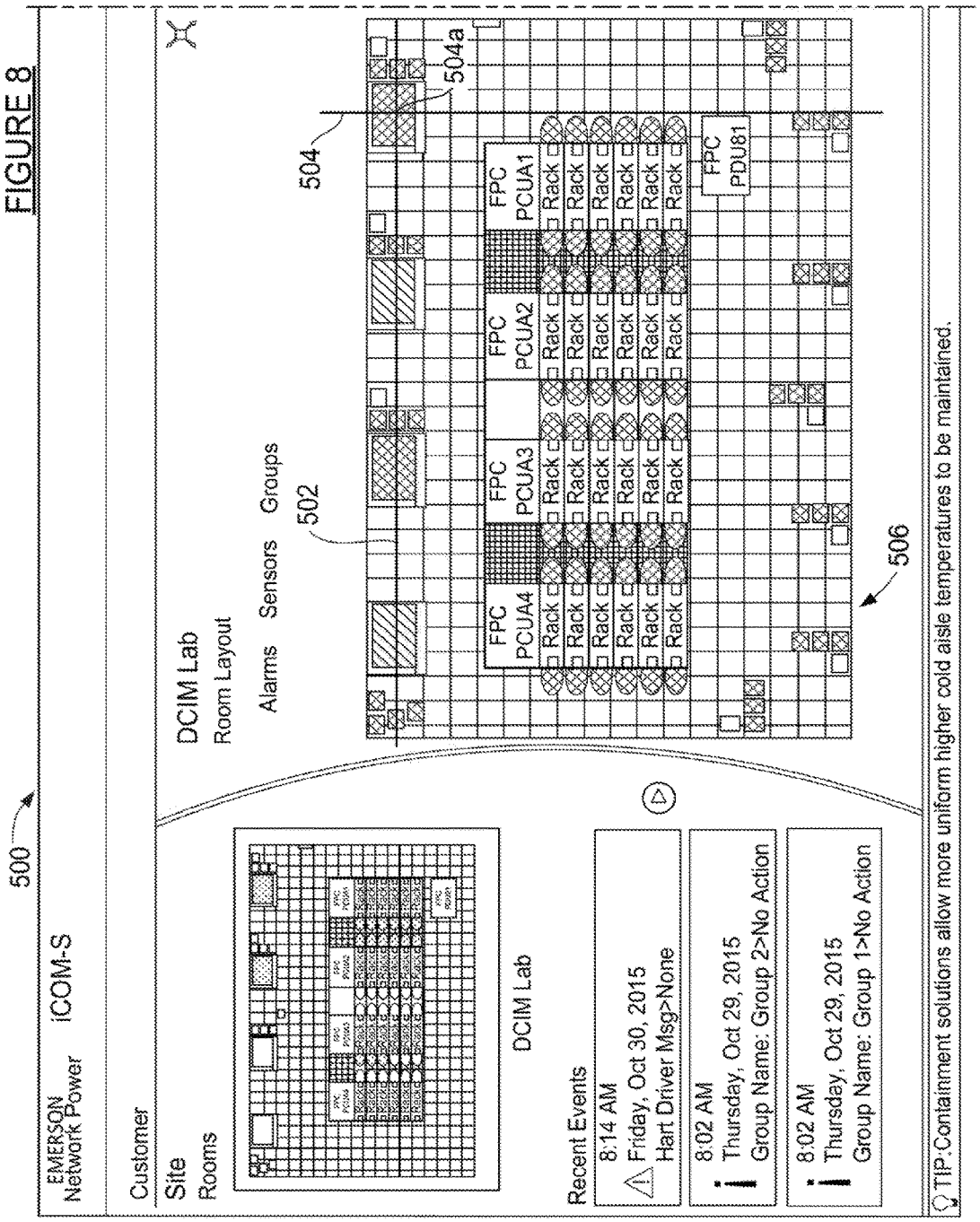

Referring to FIG. 8-8A, screen 500 illustrates another feature of the system 10 which involves the use of vertical and horizontal cross hairs 502 and 504, respectively, which are positioned over a component which has been selected by the user in the "Room Layout" display or selected by the user on a different screen from within the presentation layer 30a (i.e., GUI; e.g., a Search screen within the GUI). In this example the cross hairs 502 and 504 are positioned over a cooling unit 504a which has been selected by the user. This causes the system 10 to generate information within a pane 508 that is specifically directed to performance of the selected component (i.e., cooling unit 504a, designated with the name "CW1"). An "Air Properties" graphic 510 is generated in the pane 510 which shows the current cooling capacity (kW) of the cooling unit 504a. A table 512 also generated in the pane 510 shows current, month maximum and month minimum for the "Unit Capacity (kW)", the "Unit CFM" and the "Unit Capacity Used". When searching for a specific selected component using the system 10 from a search screen (not shown), the selected component will be indicated in a display screen, such as screen 500, using the cross hairs 502/504 so the user is provided with an immediate visual indication exactly where in a given room the component is physically located.

Figure 9:
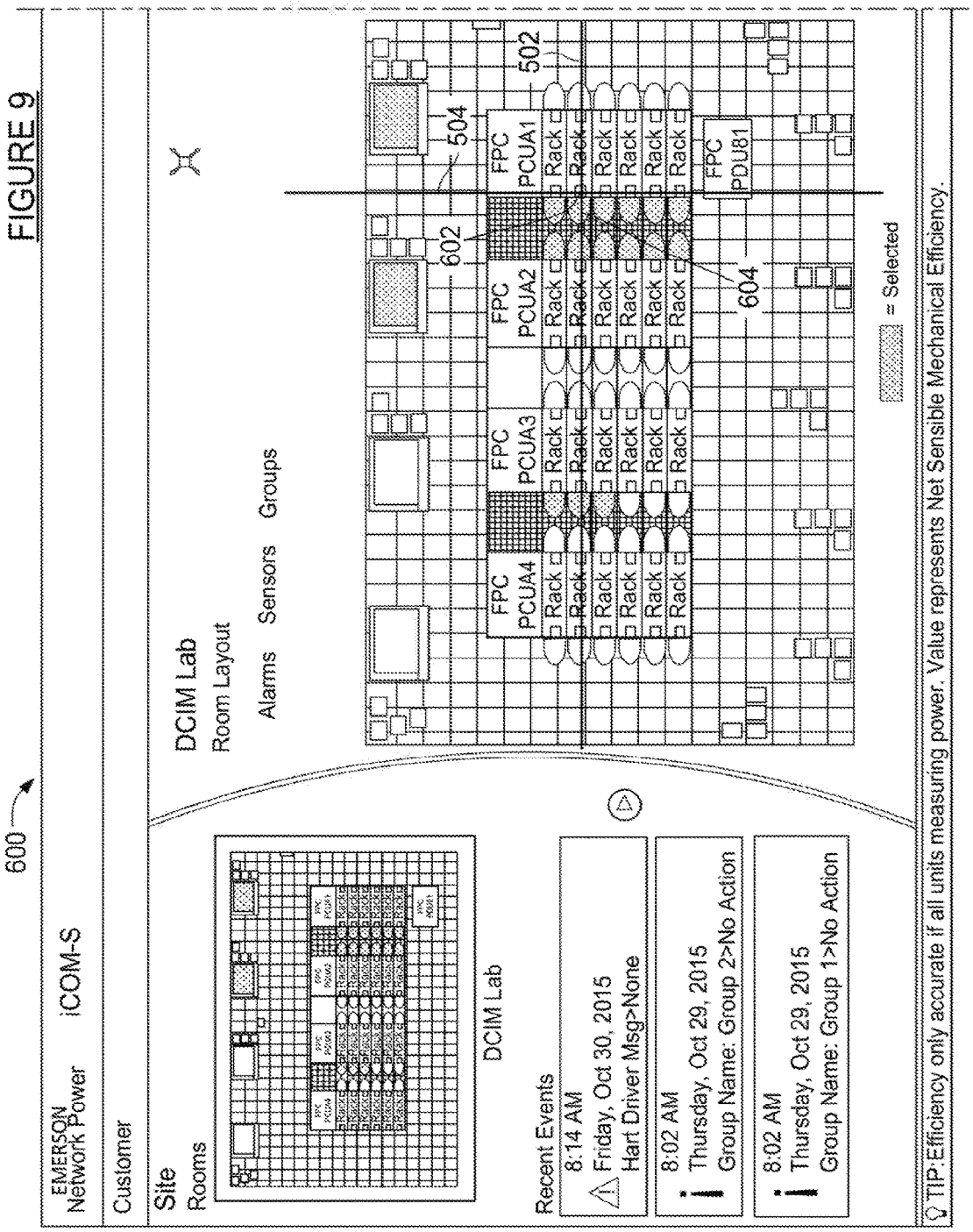
FIG. 9-9A shows the room layout of FIG. 8-8A with the cross hairs positioned over a wireless radio associated with a specific equipment rack.
Figure 9A:
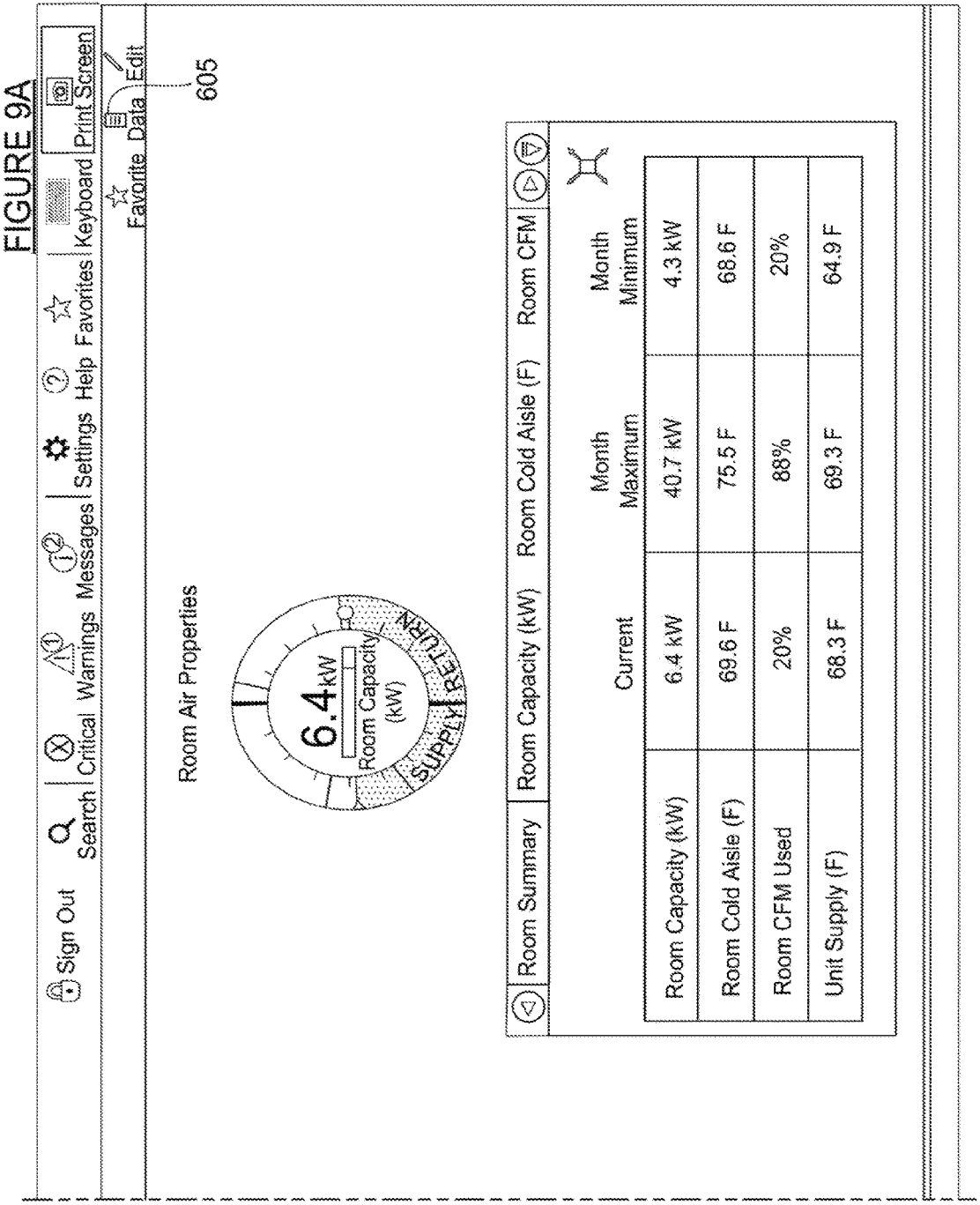
Figure 10:
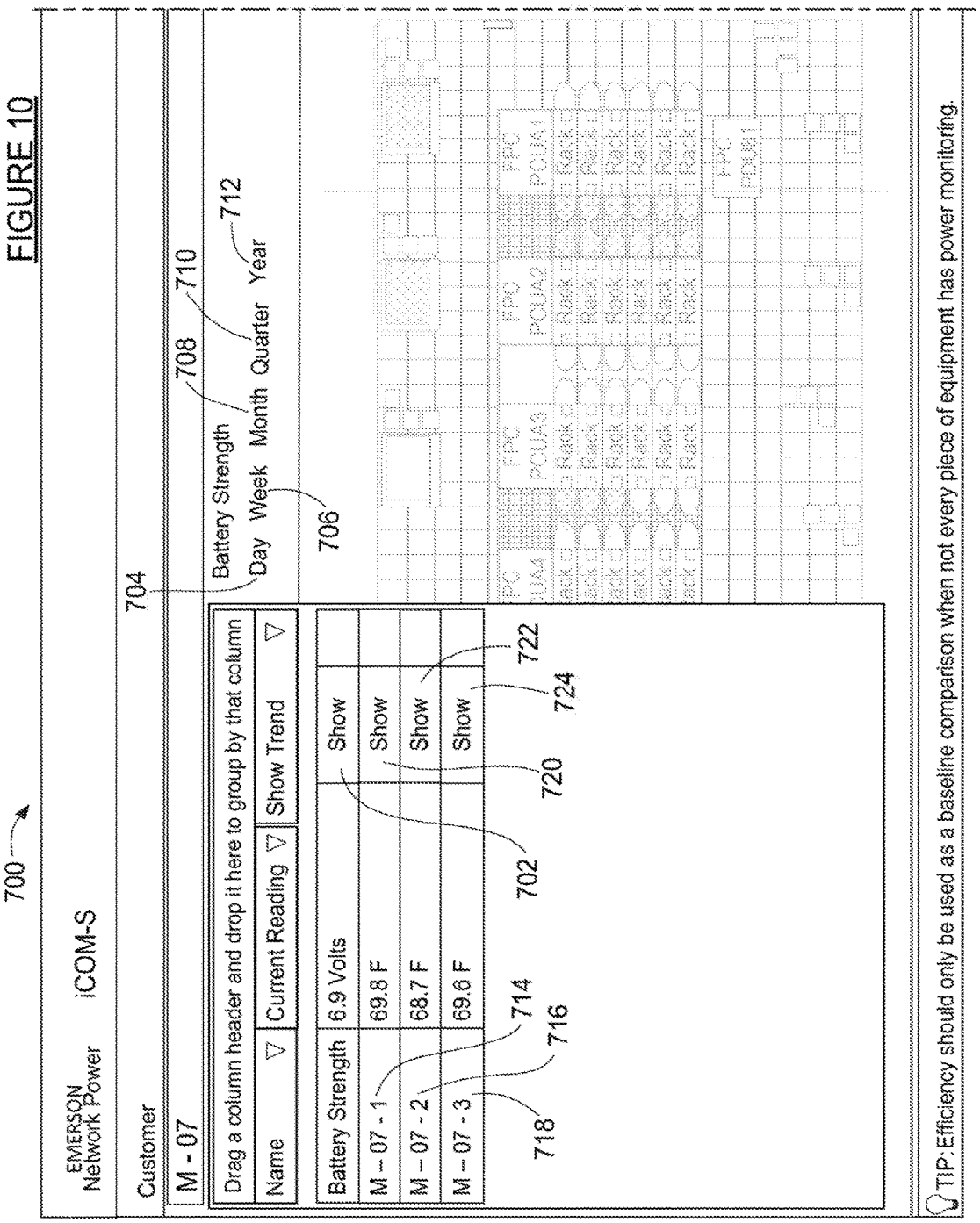

Referring to FIG. 9-9A, screen 600 shows the crosshairs 502/504 positioned over a square shaped graphic representing a specific battery powered wireless radio 602 associated with sensors 604, which are collectively located near a specific rack. Clicking the mouse button (e.g., left button) on a mouse being used with computer 30, or on a touchscreen display used with computer 30 on top of the "Data" icon 605 in the upper right context sensitive menu of screen 600, generates screen 700 of FIG. 10-10A. Screen 700 in FIG. 10-10A shows the current battery strength for the battery associated with the specific wireless radio 602 (designated by name "M-07" in this example) being used with the system 10, along with information on each of the three sensors ("M-07-1", "M-07-2" and "M-07-3") that are associated with the selected radio. A "Show" button selection 702 on the screen 700 of FIG. 10-10A, when selected, generates trend information for the battery strength in a window pane 704. The trend information can be presented according to "Day", "Week", "Month", Quarter" or "Year" by selecting any one of tabs 705, 706, 708, 710 or 712, respectively. Trend information can also be selected for each of the three sensors associated with the radio 602, herein labelled sensors 714, 716 and 718 by clicking any one of the "Show" selections 720, 722 and 724, respectively. Clicking on a "Data Export" icon 726 will also prompt the user for a file save location in which case all the data used to generate the trend will be exported to a common file format. Accordingly, the system 10 enables a wide range of historical information to be presented in a highly intuitive manner, and also in a visually easily understood manner.

The system 10 and method of the present disclosure provides a means to collect, analyze and present a large amount of useful data in a highly organized and efficient manner. This makes it easy for the user to instantly assess which areas of a data center or other environment may be too hot, too cold or within predetermined temperature limits. The system 10 also provides a means for the user to quickly and easily associate or disassociate specific sensors with one or more groups of sensors through simple command selections from a mouse or touchscreen and to see, from a mathematical standpoint, how the association of one or more sensors affects the mean, standard deviation, or other aggregated data calculated for a given group of sensors. The system 10 also enables all sensors associated with a specific gateway to be shown, along with color or shading which indicates at a glance which sensors are above or below a predetermined temperature limit, and which sensors are within a predetermined temperature range.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A computer based monitoring system for collecting, analyzing and presenting temperature information from sensors associated with an HVAC system, the system comprising:
    a network;
    a wireless gateway in communication with the network, the wireless gateway receiving electrical signals from a plurality of sensors being used to sense temperature information;
    a processor in communication with the network for communicating with the plurality of sensors via the wireless gateway and obtaining temperature data in the form of electrical signals being reported by each of the sensors;
    a graphical user interface (GUI) module embodied in a non-transient processor readable medium and configured to run on a computing device having a display screen, the GUI module configured to generate in real time a graphic on the display screen pertaining to data obtained from the sensors by the processor, the graphic including:
        a first component having a first indicia indicating a first subportion of the plurality of sensors that are indicating a temperature which is within a predetermined temperature range;
        a second component having a second indicia indicating a second subportion of the plurality of sensors that are indicating a temperature which is below a predetermined lower limit;
        a third component having a third indicia indicating a third subportion of the plurality of sensors that are indicating a temperature which is above a predetermined upper limit; and
    wherein the first component, the second component and the third component are all integrated for simultaneous display into at least one of:
    a bar graph; or
    a circular dial graph; and
    wherein the GUI module of the system uses information supplied by the processor to determine and present different types of numerical information at different locations around the first, second and third components, such that the different types of numerical information are located adjacent associated ones of the first, second and third components, depending on the dimensions of the first, second and third components, and moved in accordance with changing dimensions of the first, second and third components, to help control operation of the HVAC system.

2. The system of claim 1, wherein the different types of numerical information include numerical standard deviation information associated with the second and third subportions of the sensors being represented by the second and third components, and wherein the system displays the numerical standard deviation information along with the second and third components.

3. The system of claim 2, wherein the different types of numerical information includes numerical information relating to:
    the first component, as to a specific number of the sensors which are within the predetermined temperature range;
    the second component, as to a specific number of the sensors which are below the predetermined lower limit; and
    the third component, as to a specific number of the sensors which are above the predetermined upper limit.

4. The system of claim 1, wherein each of the first indicia, the second indicia and the third indicia comprise a different color.

5. The system of claim 1, wherein the different types of numerical information that the GUI module of the system generates includes numerical standard deviation information associated with the sensors being represented by the second and third components, and the GUI module displays the standard deviation information along with second and third components adjacent to the second and third components; and
    wherein the GUI module further generates and displays graphics of numerical information at opposite ends thereof for a maximum standard deviation of a specific one of the sensors represented by the second component, and a maximum standard deviation of a specific one of the sensors represented by the third component.

6. The system of claim 1, wherein the graphic comprises a horizontal bar graph.

7. The system of claim 1, wherein a relative dimension of each of the first, second and third components of the graphic changes depending upon a number of the plurality of sensors associated therewith.

8. The system of claim 1, wherein:
    the first indicia for the first component comprises a green color;
    the second indicia for the second component comprises a blue color; and
    the third indicia for the third component comprises a red color.

9. The system of claim 1, wherein the first component has a larger vertical component than the second and third components.

10. The system of claim 1, wherein the different types of numerical information includes:
   numerical information on a specific number of the sensors, which is presented adjacent to each of the first, second and third components; and
   numerical information concerning a standard deviation of the sensors being represented by the second and third components of the graph, which is presented adjacent the second and third components.

11. The system of claim 10, wherein:
   the numerical information concerning the standard deviation for the second component provides a number associated with the maximum standard deviation for the sensors being represented by the second component; and
   the numerical information concerning the standard deviation for the third component provides a number associated with the maximum standard deviation for the sensors being represented by the third component.

12. The system of claim 11, wherein:
   the first indicia associated with the first component comprises a first color;
   the second indicia associated with the second component comprises a second color different from the first color; and
   the third indicia associated with the third component comprises a third color which is different from both the first and second colors.

13. A computer based monitoring system for collecting, analyzing and presenting temperature information from sensors associated with an HVAC system, the system comprising:
   a network;
   a wireless gateway in communication with the network, the wireless gateway receiving electrical signals from a plurality of sensors being used to sense temperature information;
   a processor for communicating with the plurality of sensors via the wireless gateway and obtaining temperature data represented by electrical signals being reported by each of the sensors;
   a graphical user interface (GUI) module embodied in a non-transient computer readable medium and configured to run on a computing device having a display screen, the GUI module configured to receive information from the processor concerning temperature data being reported by the sensors;
   the GUI module configured to generate in real time a graph on the display screen, using the temperature data reported by the sensors, the graph including:
      a first component having a first indicia indicating a first subplurality of the plurality of sensors that are indicating a temperature which is within a predetermined temperature range;
      a second component having a second indicia indicating a second subplurality of the plurality of sensors that are indicating a temperature which is below a predetermined lower temperature limit, along with a standard deviation number associated with the temperature data from with the second subplurality of the sensors;
      a third component having a third indicia indicating a third subplurality of the plurality of sensors that are indicating a temperature which is above a predetermined upper temperature range, along with a standard deviation number associated with the temperature data from with the third subplurality of the sensors; and
   the first, second and third components being presented adjacent one another on the graph together with the standard deviation number associated with each of the first, second and third components; and
   wherein the GUI module uses information supplied by the processor to determine and present additional first, second and third numerical data for each of the first, second and third indicia, together with the standard deviation number associated with each of the first, second and third indicia, such that the additional first, second and third numerical data, together with the standard deviation number associated with each, is located adjacent associated ones of the first, second and third components, and is re-positioned depending on changing dimensions of the first, second and third components, to help control operation of the HVAC system.

14. The system of claim 13, wherein:
   the first indicia comprises a first color;
   the second indicia comprises a second color different from the first color; and
   the third indicia comprises a third color different from the first and second colors.

15. The system of claim 13, wherein:
   the standard deviation number associated with the second subplurality of sensors comprises a maximum standard deviation of the second subplurality of sensors associated with the second component; and
   the standard deviation number associated with the third subplurality of sensors comprises a maximum standard deviation of the third subplurality of sensors associated with the third component.

16. The system of claim 13, wherein:
   the additional first numerical data comprises a number disposed adjacent the first component indicating a total number of the first subplurality of sensors associated with the first component;
   the additional second numerical data comprises a number disposed adjacent the second component indicating a total number of the second subplurality of sensors associated with the second component; and
   the additional third numerical data comprises a number disposed adjacent the third component indicating a total number of the third subplurality of sensors associated with the third component.

17. The system of claim 13, wherein the graph comprises a horizontal bar graph.

18. A computer based monitoring method for collecting, analyzing and presenting temperature information from sensors associated with an HVAC system, the method comprising:
   providing a network;
   using a wireless gateway to communicate with the network to receive electrical signals from a plurality of sensors being used to sense temperature information;
   using a processor for communicating with the plurality of sensors via the wireless gateway and to obtain temperature data in the form of electrical signals being reported by each of the sensors;
   using a graphical user interface (GUI) module embodied in a non-transient, computer readable medium and configured to run on a computing device having a display screen, the GUI module generating in real time a graph on the display screen, the graph forming at least one of a bar graph and a circular dial graph, and the graph including:
- a first component having a first indicia indicating a first subportion of the plurality of sensors that are indicating a temperature which is within a predetermined temperature range;
- a second component having a second indicia indicating a second subportion of the plurality of sensors that are indicating a temperature which is below a predetermined lower temperature limit, along with a standard deviation number associated with the second subportion of the plurality of sensors;
- a third component having a third indicia indicating a third subportion of the plurality of sensors that are indicating a temperature which is above a predetermined upper temperature limit, along with a standard deviation number associated with the third subportion of the plurality of sensors; and the first, second and third components being presented adjacent one another on the graph together with the standard deviation number associated with each of the first, second and third components; and wherein the GUI module uses information supplied by the processor to determine where to locate standard deviation data associated with each of the first, second and third components, to maintain the standard deviation data associated with each said component grouped together regardless of changing dimensions of the first, second and third components, to help control operation of the HVAC system.

19. The method of claim 18, wherein:

the graph comprises a bar graph;

the first indicia comprises a first color;

the second indicia comprises a second color different from the first color;

the third indicia comprises a third color different from the first and second colors; and further comprising displaying a number adjacent each of the first, second and third components to indicate a number of the sensors that is associated with each said component of the graph.

* * * * *